United States Patent [19]

Chung

[11] Patent Number: 4,692,833

[45] Date of Patent: Sep. 8, 1987

[54] SAFETY DEVICE FOR COMMUNICATION EQUIPMENT

[75] Inventor: Ki Ho Chung, Seoul, Rep. of Korea

[73] Assignee: Samhwa Electric Industrial Co., Seoul, Rep. of Korea

[21] Appl. No.: 844,548

[22] Filed: Mar. 27, 1986

[30] Foreign Application Priority Data

May 11, 1985 [KR] Rep. of Korea .................. 1985-5469
Sep. 26, 1985 [KR] Rep. of Korea ................ 1985-12567

[51] Int. Cl.[4] ................................................ H02H 3/20

[52] U.S. Cl. ........................................ 361/91; 361/93; 361/105; 361/111; 361/119

[58] Field of Search ........................ 361/86, 87, 91, 93, 361/99, 103, 105, 110, 111, 119, 124; 337/26, 112

[56] References Cited

U.S. PATENT DOCUMENTS

| | | | |
|---|---|---|---|
| 3,716,757 | 2/1973 | Rodriguez | 361/105 |
| 4,074,337 | 2/1978 | Debortoli et al. | 361/119 X |
| 4,288,833 | 9/1981 | Howell | 361/105 X |
| 4,313,147 | 1/1982 | Uchida et al. | 361/119 |
| 4,422,121 | 12/1983 | Baumbach | 361/119 |
| 4,424,546 | 1/1984 | Smith | 361/119 |

*Primary Examiner*—A. D. Pellinen
*Assistant Examiner*—Derek S. Jennings
*Attorney, Agent, or Firm*—Willian Brinks Olds Hofer Gilson & Lione

[57] ABSTRACT

A safety device for protecting communications equipment that is coupled to a communications line. The device includes a safety connector having overcurrent and overvoltage protection means therein for connecting the communications line to ground upon occurrence of an overcurrent or overvoltage on the line. The safety device includes a housing and receptacles for connecting to input and output terminals of the communications line and to a ground terminal, wherein the terminals are on a terminal stand that serves many communications lines and receives many safety devices thereon. The overcurrent protection means employs a bimetal element that is heated by a heating coil connected in the communication's line. The overvoltage protection means includes a gas discharge tube which also may include bimetal elements.

12 Claims, 17 Drawing Figures

SAFETY DEVICE FOR COMMUNICATION EQUIPMENT

TECHNICAL FIELD

The present invention relates generally to a safety device for communication equipment. It is more specifically directed to a safety device which protects against the undesired application of overcurrent or overvoltage in the equipment side when the equipment is arranged between the output line side and the input line side in communication lines, and the overcurrent or the overvoltage on the output line side is produced by the output line contacting high voltage lines or due to lightning.

BACKGROUND OF THE INVENTION

The safety device which has been broadly used in the prior art is shown in FIG. 1 to FIG. 4. Terminal stand 101 is manufactured for a fixed number of lines such as 10 lines, 25 lines, 50 lines or 100 lines. The stand 101 includes input terminals 102, output terminals 103, and terminal receiving holes 105 having connecting terminals therein, as illustrated in FIG. 2. Connection between terminals is made by solder joints, one by one, with electric wire. Accordingly, the construction of the prior art safety connector is complex and requires a great deal of labor.

Further, within the prior art safety connector 104 is a cylindrical tube 109, FIG. 3, which has a heating coil 108 wound on the outer circumference thereof. Tube 109 is secured on the upper surface of the connecting terminal 114 that is mounted on the upper surface of the inserting terminal 107. As illustrated in FIG. 4, coil 108 is serially connected in the line of the safety connector. In the upper end portion of the cylindrical tube 109 is inserted a projecting piece 110 which is secured to the tube 109 by solder of relatively low melting temperature. On the upper surface of the projecting piece 110 is mounted a discharge tube 112 which is enclosed within an electrical ground case 113. As illustrated in FIGS. 3A and 4A, ground case 113 normally is physically and electrically out of contact with connecting terminal 114. It is seen that each safety connector 104 serves two communication lines.

Spring 115 is retained in compression between ground case 113 and a ground plate 117 which is electrically and physical attached to ground terminal 116. When current below a predetermined value flows in the communication line heating coil 108, heating coil 108 of the safety connector 104 does not cause overheating and the solder that holds projecting piece 110 above the end of tube 109 is not melted.

However, when current above a predetermined value flows through heating coil 108, this overcurrent causes heating coil 108 to produce sufficient heat to melt the solder that holds projecting piece 110 in the tube 109. Accordingly, the projecting piece 110 is pushed downwardly and within the cylindrical tube 109 by the force of the spring 115 acting on ground case 113, discharge lamp 112 and the projecting piece. The circumferential surface on the lower end of ground case 113, now makes physical and electrical contact with the connecting terminal 114 see FIGS. 3B and 4B, and the overcurrent flows to ground through the path of the connecting terminal 114, ground case 113, spring 115, ground plate 117 and ground terminal 116. Accordingly, damage to the communication equipment by the overcurrent may be avoided.

Further, when overvoltage is applied in the circuit, discharge is produced within the discharge tube 112 of the safety connector 104. Thus, the grounding circuit having the electrical path through the inserting terminal 107, connecting terminal 114, projecting piece 110, discharge tube 112, ground case 113, spring 115, ground plate 117 and the ground terminal 116 is formed to provide a path to ground. Accordingly, damages to the communication equipment by the overvoltage is avoided.

In the prior art device shown in FIGS. 1 to 4, the discharge tube 112 is a cylindrical ceramic member having two facing electrodes.

Because of the production of high heat in the prior art safety devices (for example, up to about 1,600° C.), damage because of fire is possible.

Upon occurrence of the overcurrent as described above, the ground case 113 comes into contact with connecting terminal 114. Accordingly, when the overcurrent or overvoltage is applied, the above-described prior art device has drawbacks which make it desirable to change the safety connector 104, or components thereof. Further, the prior art device requires testing or inspection of each of the individual circuits because direct visual inspection of the safety connector 104 is not possible. Additionally, in the prior art safety device, when dealing with tens of thounds to hundreds of thousands of lines, the required size of the safety device becomes quite large.

Because the inner wiring of the terminal stand 101 is connected by solder, the electric wire working processes are complex, difficult, and time consuming. Accordingly, production cost is high. Additionally, errors in making the wiring connections reduce the reliability of such devices. Furthermore, Korean laid-open Utility Model Publication No. 2198/1983 (Publicated Nov. 14, 1983, "Safety Device for Communication") discloses constructions in which the safety circuit is returned to the original state, together with an overvoltage protective element of the safety connector is cut off overcurrent by resistance and uses a base stand that includes printed circuitry.

In the above Utility Model Publication, by arranging printed circuitry on the base stand unit that provides the terminal stand, productability is increased and wiring errors are eliminated. However, when each of input and output terminals is, one by one, connected by solder joints on both end portions of the print circuit of the base stand unit, and in particular, when the overcurrent is caused by lightning, current above 200 A is instanteously passed. Accordingly, the printed circuitry possibly may be damaged. Further, because the overcurrent protective element that controls the flow of current is a resistance element, the fixed resistance valve has a tendency to increase with time and usage. Thus, sensitivity of the communication equipment is lowered.

On the other hand, the overvoltage protective element is deficient in security because the discharge tube is possibly burnt off the safety connector itself by the heat of discharge.

SUMMARY OF THE INVENTION

It is the purpose of the present invention to provide a safety device for communication equipment which overcomes the deficiencies of the above-described prior art, and which comprises a terminal stand with required lines combined with a base stand unit, and is fully operated when overcurrent or overvoltage is applied to the circuit. Each of the device terminals connect to a communicating bar, and overcurrent and overvoltage protective elements return to their original positions when normal current is reapplied in the circuit.

The present invention comprises a safety device which has an overcurrent protective element comprised of two bimetal connecting terminals and a heat coil wound on the outer circumference of the metal connecting terminals, and an overvoltage protective element having bimetal contacts within the discharge tube in the safety connector. The bimetal contacts of the overcurrent protective element or overvoltage protective element are closed and provide a path to ground when abnormal current is produced, whereby safety of the equipment is provided. The circuit is returned to its normal state when normal current is reapplied.

Other features and advantages of the present invention will become apparent from the following detailed description, taken in conjunction with the accompanying drawings.

BRIEF DESCRIPTION OF THE DRAWINGS

FIGS. 17(A) and (B) are sectional views of one embodiment of the safety device using a plug with cord, in which FIG. 17(A) is a sectional view illustrating the plug and the safety device.

DESCRIPTION OF PREFERRED EMBODIMENT

Figure 7A:
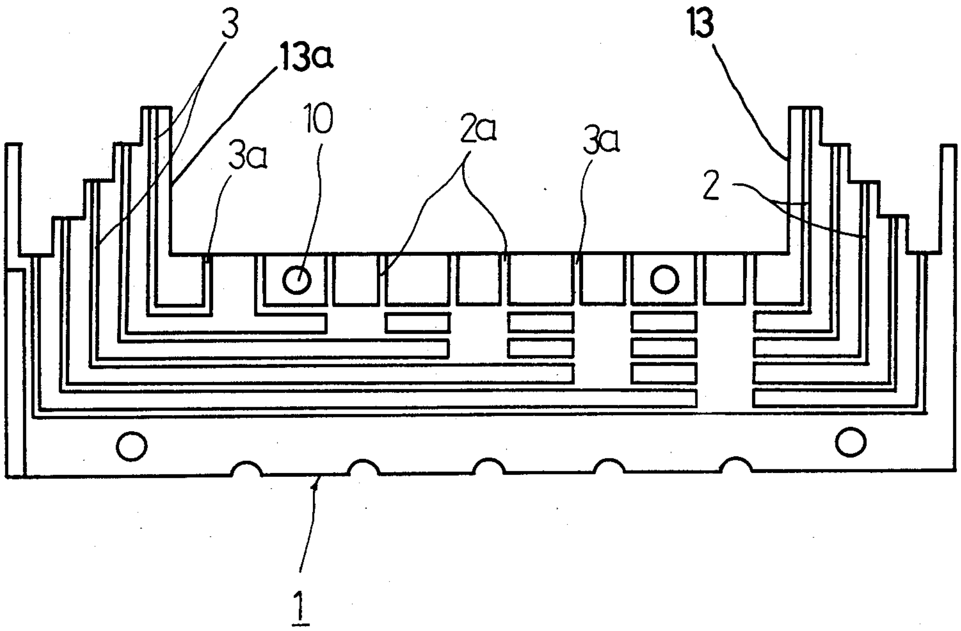
FIGS. 7(A) and (B) are views of base stand units constructed according to the present invention.
Figure 7B:
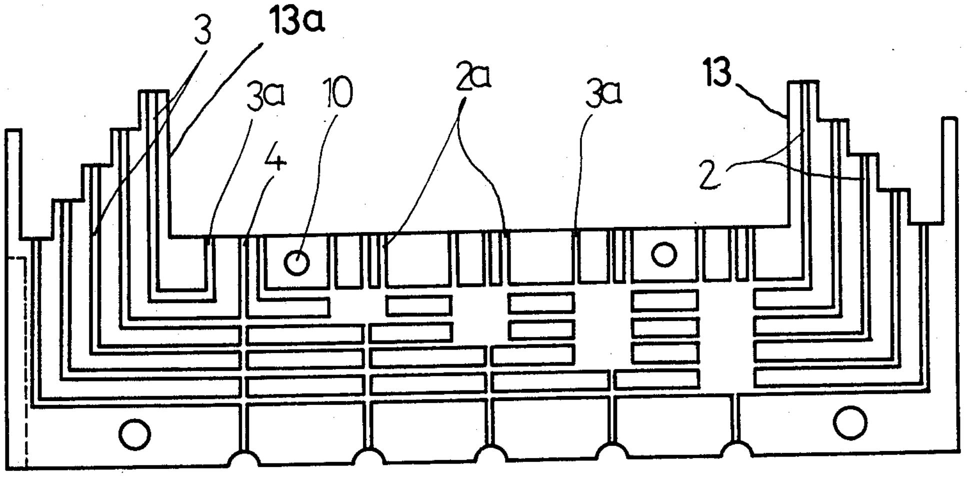

Turning now more specifically to FIGS. 5 to 9, reference numeral 1*a* is a base stand of the base stand unit 9 which is arranged, see FIGS. 7A and B, with inserting grooves 2, 2*a*, 3 and 3*a* respectively, for serving five communication lines. Communicating bars 7 and 7*a* connect input terminals 5 with terminals 5*a* that receive an inserted connector, and communicating buss 7*a* connect output terminals 6 with terminals 6*a* that receive an inserted connector. The base stand unit 9 is further formed by inserting ground conductor bars 8 in vertical grooves 4, see FIGS. 7B and 8.

A plurality of connecting holes 10 extend through the base stand unit 9. A complete terminal stand 11, FIG. 5, may be assembled by tightly connecting together the base stand units 9 by bolts that pass through holes 10, for example.

Figure 8A:
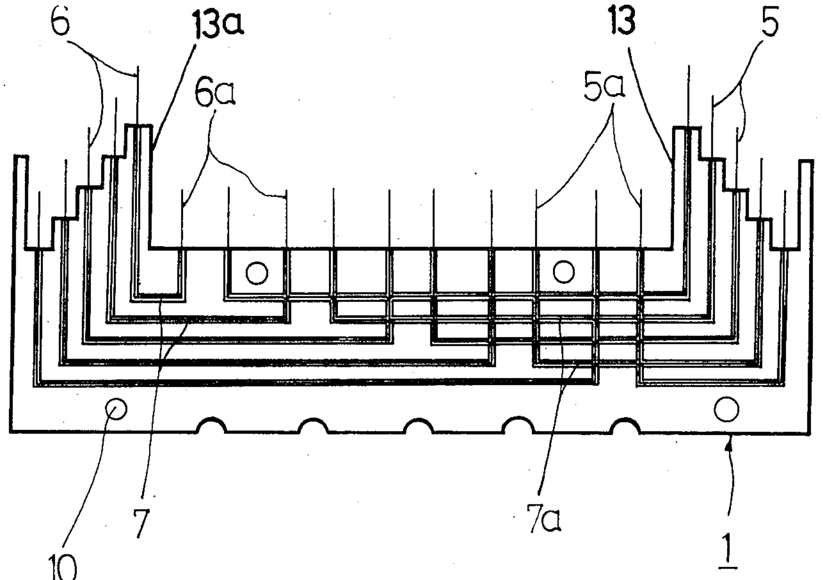
FIGS. 8(A) and (B) are front views showing communicating bars and ground terminals on the base stand units of FIGS. 7(A) and (B).
Figure 8B:
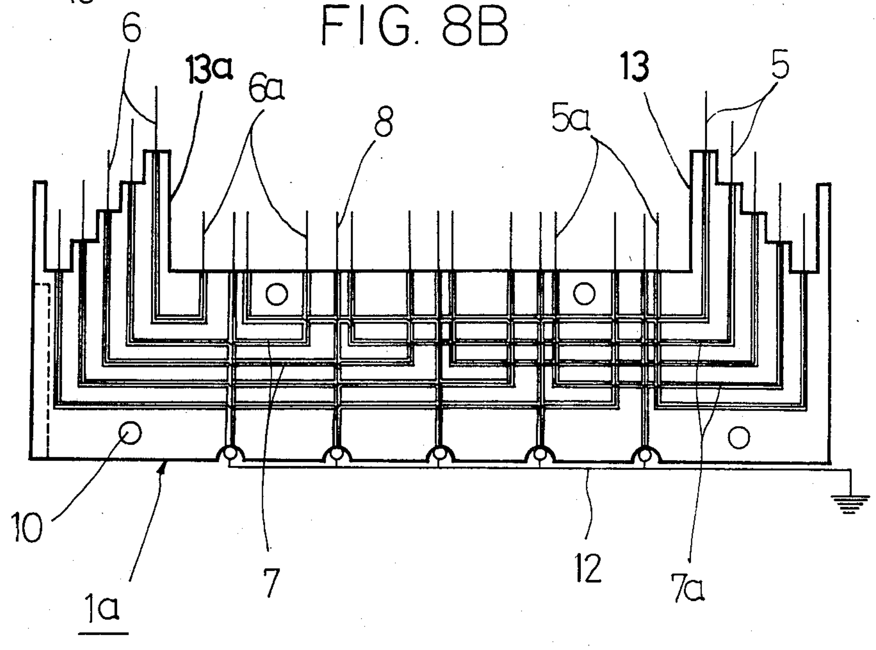

Reference numeral 12, FIG. 8B, designates a common ground line connected to each of the ground terminals 8. Reference numerals 13 and 13*a* are inner wall surfaces on both sides on the terminal stand 11. The safety connectors 15, FIG. 5, which are inserted on the terminal stand 11 are positioned within and held by the inner wall surfaces 13 and 13*a*.

Referring now from FIG. 10 to FIG. 14, reference numeral 15 is a safety connector which has tightly disposed therein overcurrent protective elements 16 and overvoltage protective elements 17, which function to prevent damage to communication equipment on the input line side by abnormal current produced on the output line side. Safety connectors 15 are inserted onto the ground terminal 8 and the inserting terminal 5*a* and 6*a* projecting from the upper surface of the terminal stand 11.

Figure 1:
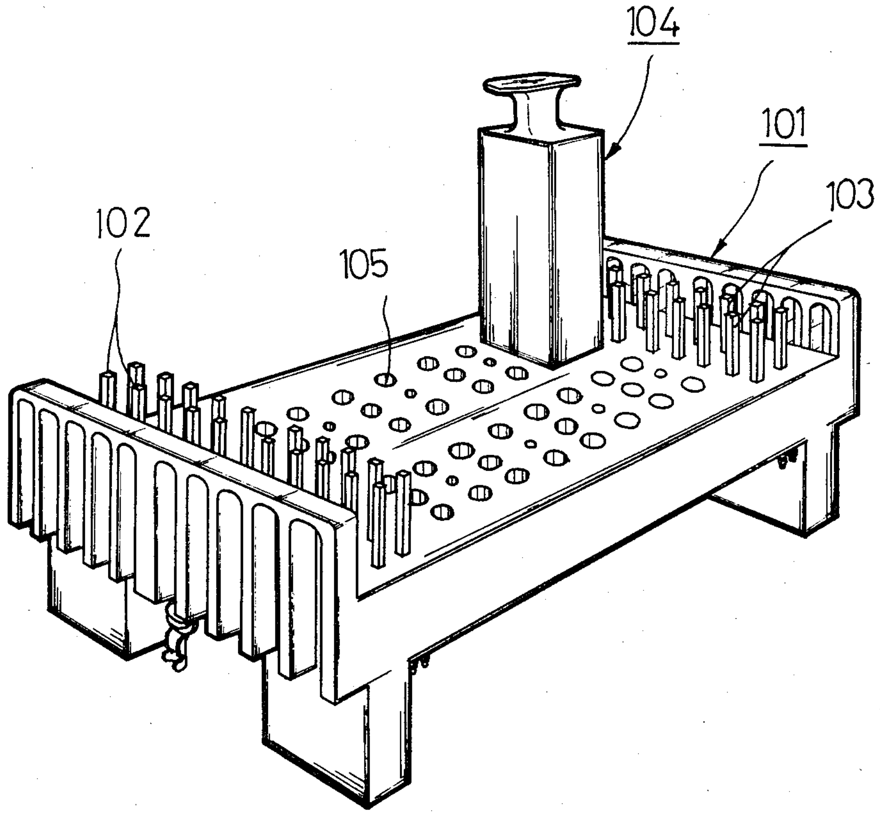
FIG. 1 (PRIOR ART)
FIG. 1 is a perspective view illustrating a prior art safety connector inserted in the terminal stand of a safety device for communication equipment.
Figure 2:
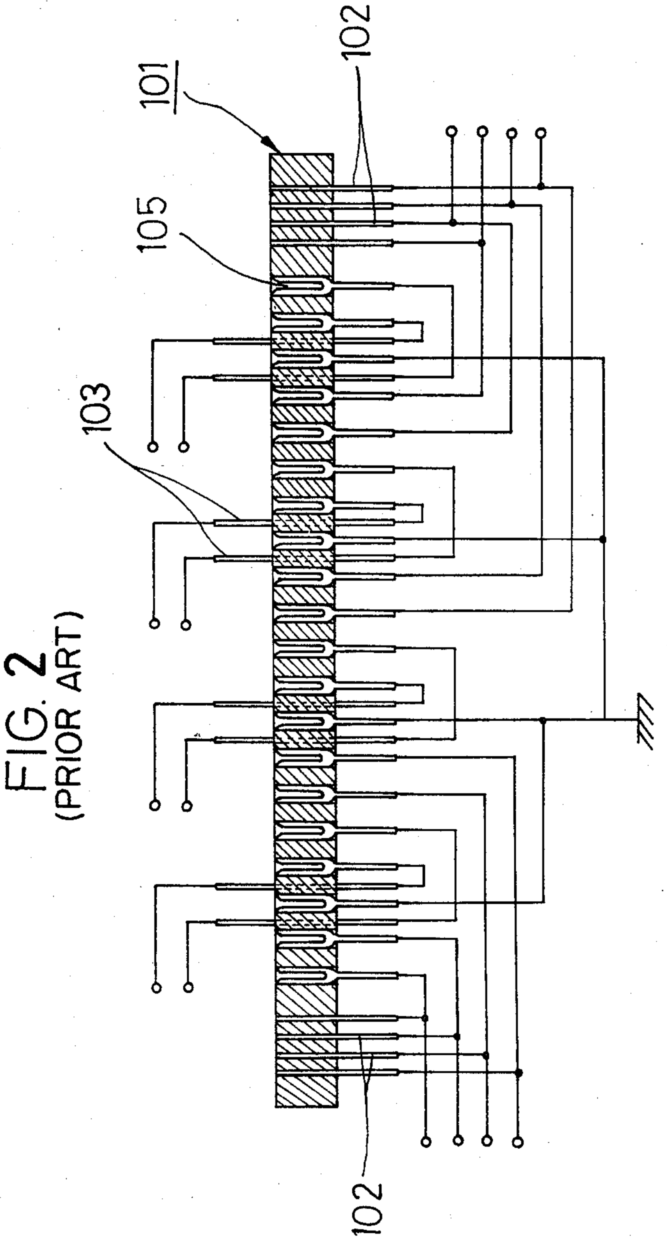
FIG. 2 (PRIOR ART)
FIG. 2 is a wiring diagram for the prior art terminal stand of a safety device for communication equipment.
Figure 3A:
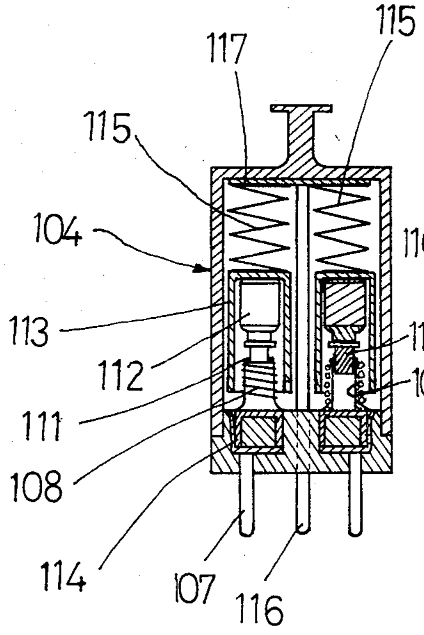
FIG. 3A PRIOR ART
FIGS. 3(A) and (B) are views illustrating operational states of the prior art safety connectors for communication equipment.
Figure 3B:
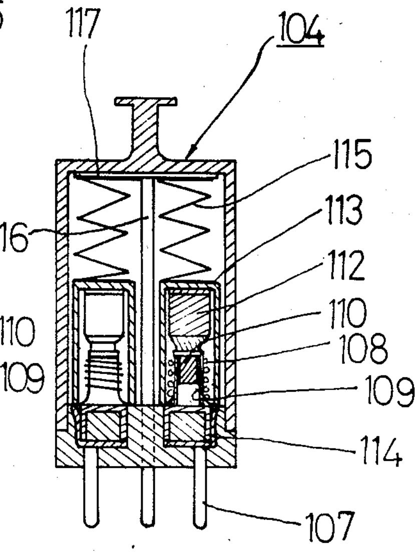
FIG. 3B PRIOR ART
Figure 4:
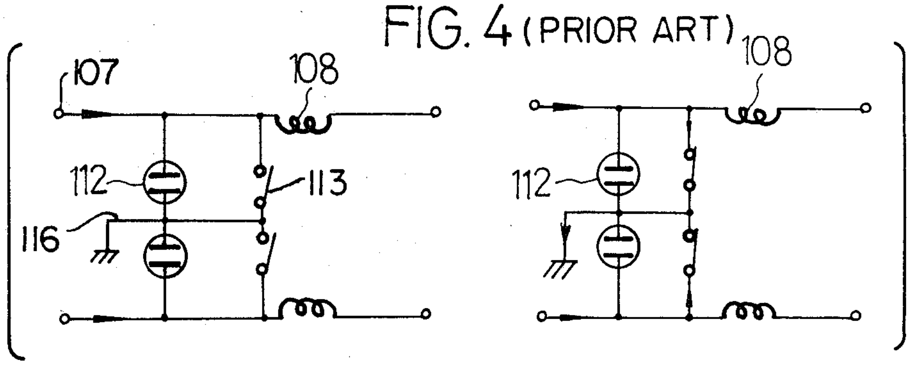
FIG. 4 (PRIOR ART)
FIGS. 4(A) and (B) are circuit diagrams illustrating the operational states of FIGS. 3(A) and (B).
Figure 5:
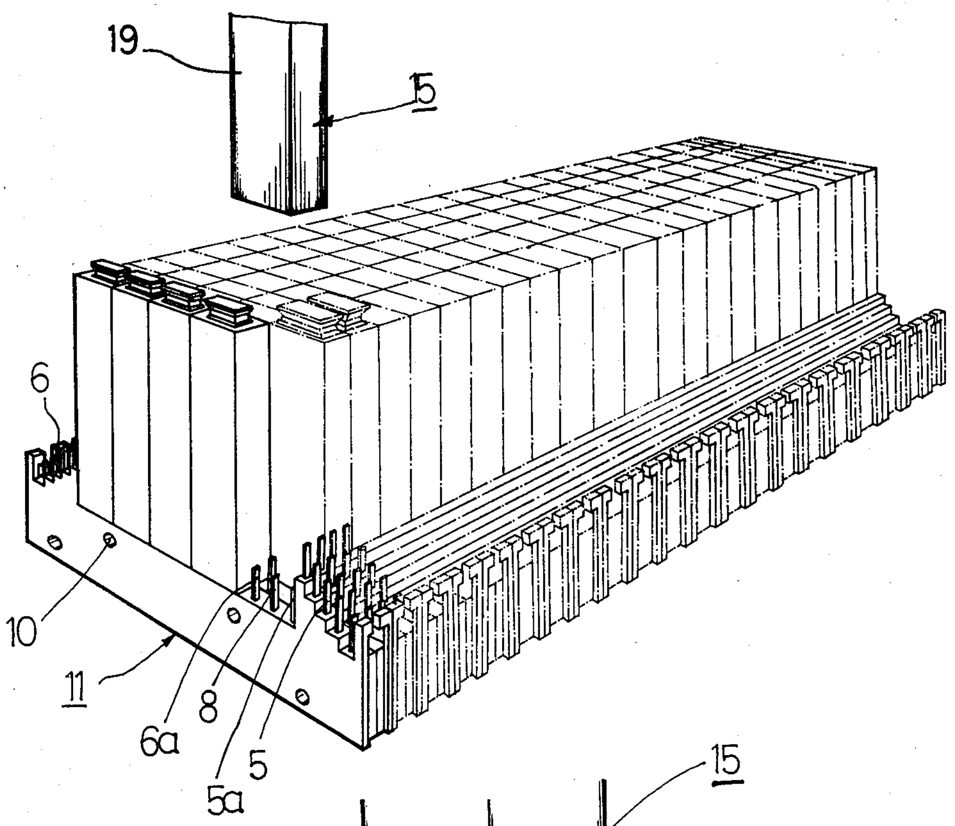
FIG. 5 is a perspective view illustrating the operational state of one embodiment of a safety device constructed according to the present invention.
Figure 6:
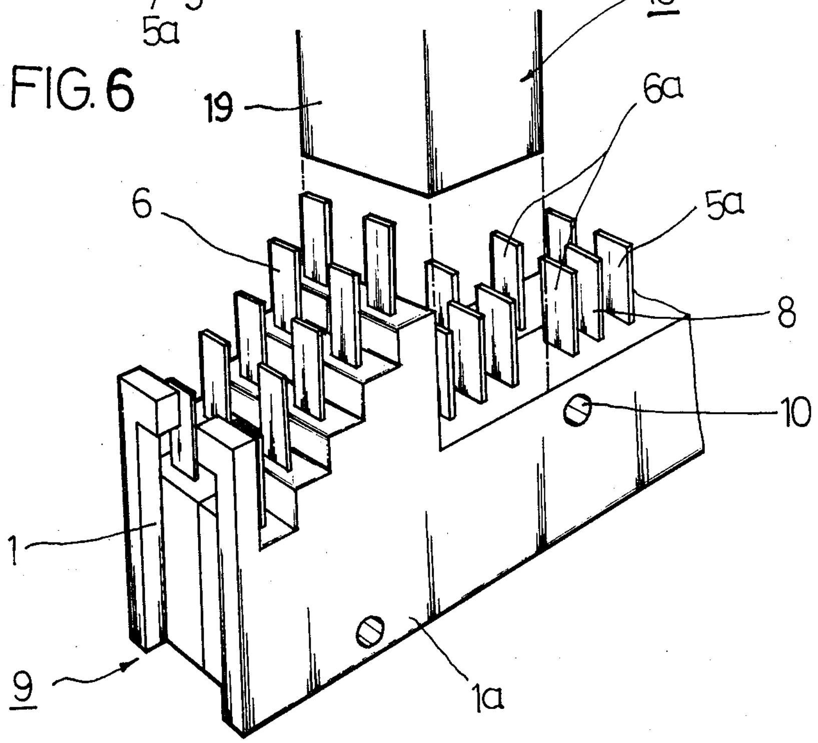
FIG. 6 is an enlarged and exploded perspective view of a in major part of the safety device constructed according to the present invention.
Figure 10A:
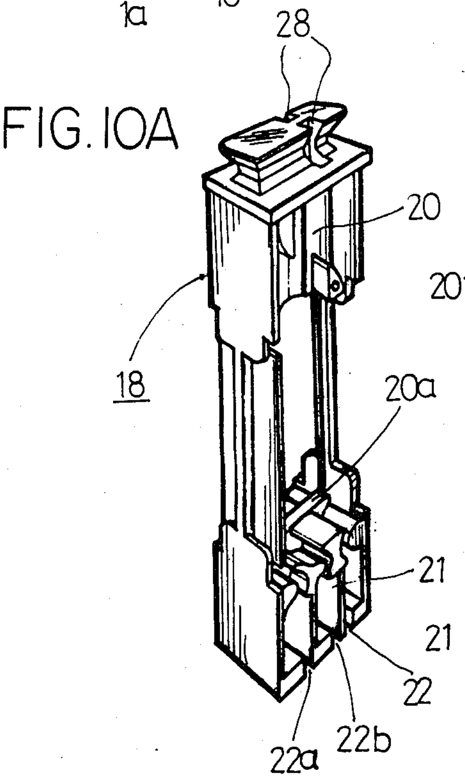
FIGS. 10(A) and (B) are perspective views showing front and rear views of housing bodies of the safety connectors according to the present invention.
Figure 10B:
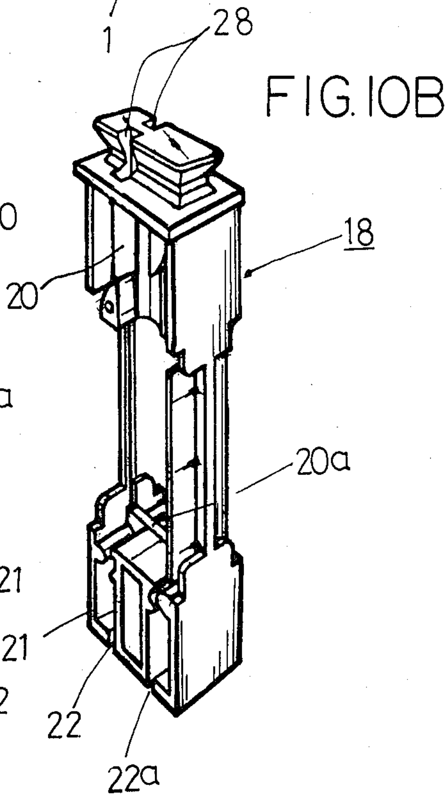
Figure 11A:
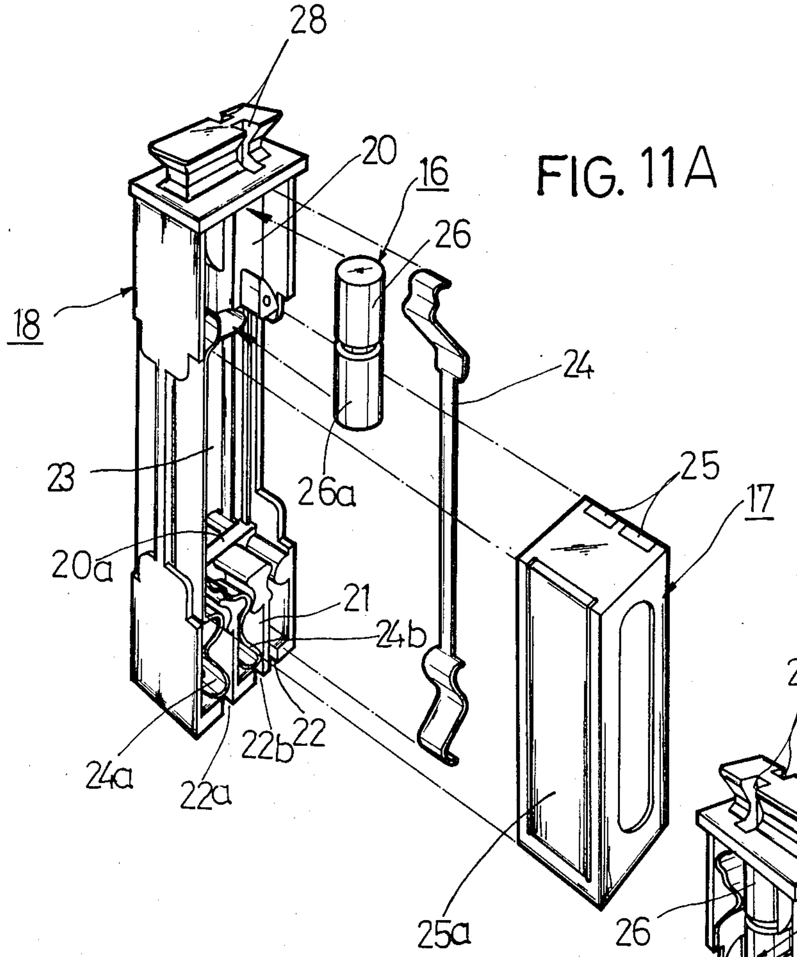
FIGS. 11(A) and (B) are exploded perspective views illustrating components that accompany the housing bodies of FIGS. 10(A) and (B).
Figure 11B:
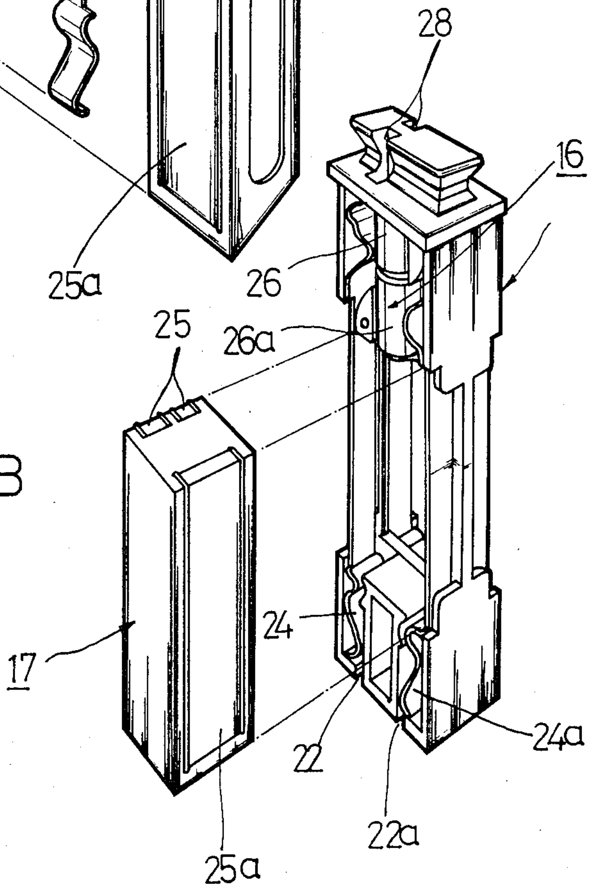
Figure 12A:
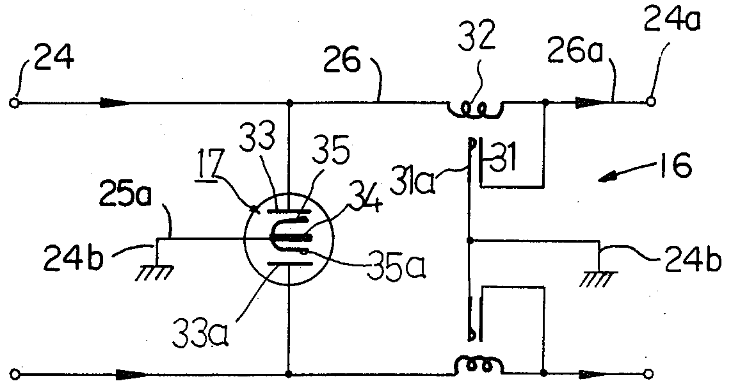
FIGS. 12(A) and (B) are circuit diagrams illustrating operational states of the safety connectors according to the present invention.
Figure 12B:
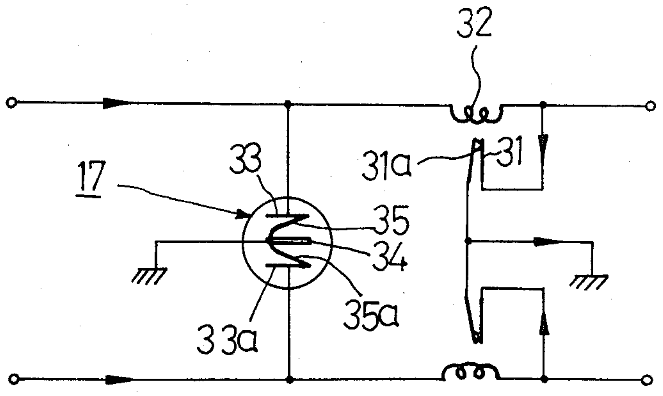

The safety connector 15 has a housing body 18 and housing 19 (FIGS. 5, 10 and 11). The housing body 18 is divided into two parts with plates 20 and 20*a* on the upper and lower end portions. Both sides or faces of the plate 20*a* on the lower end portion have formed thereon a plurality of cells 21. Connecting aspertures 22, 22*a* and 22*b* are on the bottom surface of respective cells. Both surfaces or faces of the plate 20 on the upper end portion are adapted to have tightly inserted thereon respective overcurrent protective elements 16, see FIG. 11A.

An overvoltage protective element 17 is inserted into an opening 23 in the center portion of the housing body 18 of safety connector 15.

Reference numerals 24,24*a* and 24*b* indicate the input, output and ground connecting terminals, respectively, which are tightly inserted within the housing body 18 of the safety connector 15. As illustrated in FIGS. 9, 11A and 11B, and 12A and 12B, input terminal 24 is in contact at its bottom end with connecting aperture 22 (connecting bar 7*a*) and in its midregion with contact 25 of overvoltage protection device 17. The top end of terminal 24 is in contact with the top conductive cap or terminal 26 of overcurrent protective device 16. Output terminal 24*a* at connecting aperture 22*a* (output terminal 6) is in contact with lower terminal 26*a* of overcurrent protective device 16.

The ground terminal 24*b* is in contact at one end with the connecting aperture 22*b* (ground condutor 8) and with contact 25*a* of the overvoltage protective element 17. Ground connection 27 FIG. 13, on overcurrent protection device 16 also is connected to ground contact 24*b*.

Reference numerals 28 designate plug openings which are drilled on the upper surface of the housing body 18 of the safety connector 15. When the two projecting rods 30 of plug 29 (FIG. 15) are inserted into the plug openings 28, the input terminal 24, which normally is in contact with upper end 26 of the overcurrent protective element 16, is displaced out of contact with end 26, see FIG. 16B, thus opening that circuit.

Figure 13A:
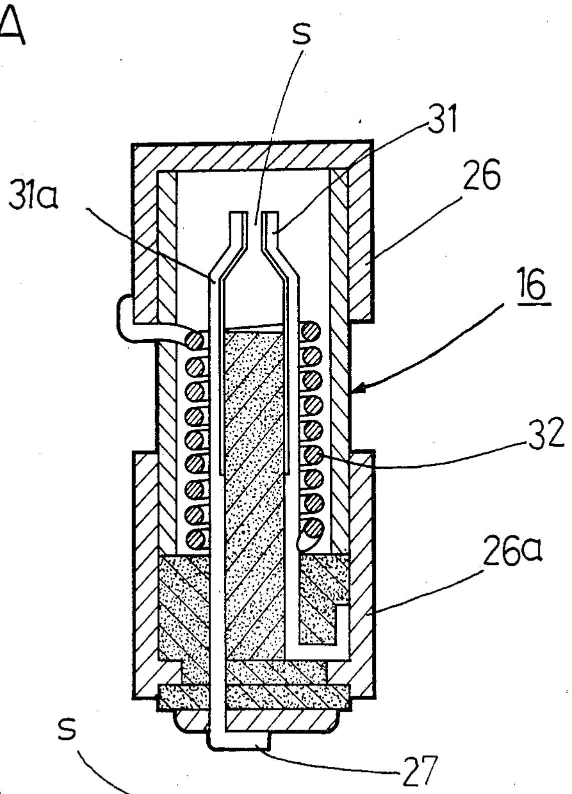
FIGS. 13(A) and (B) are sectional views showing operational states of overcurrent protective elements according to the present invention.
Figure 13B:
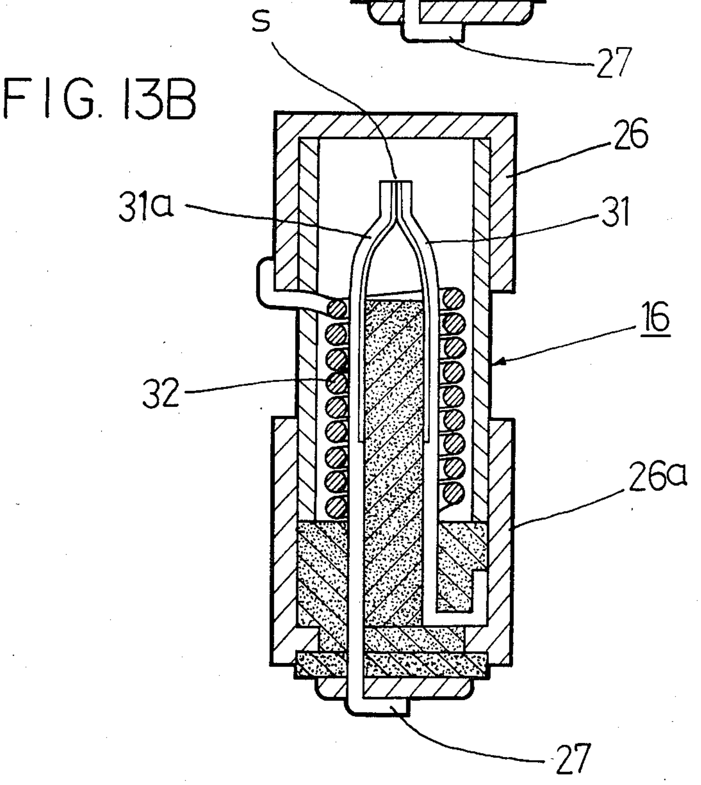

Next, construction, of the overcurrent protective element 16 will be described in greater detail by referring to FIGS. 13(A) and (B). Around the outer circumference of two bimetal connecting terminals 31 and 31*a* is wound the heating coil 32 and one end of the heating coil 32 is connected on the cylindrical upper end 26 of overcurrent device 16. The opposite end of coil 32 is connected to the bimetal connecting terminal 31 and to the cylindrical lower end 26*a* of device 16. Ground terminal 27 is formed integrally on the lower end of bimetal terminal 31*a*.

The construction of the overvoltage protective element 17 will be described greater detail with reference to FIGS. 14(A) and (B). In the discharge tube 17, both electrodes 33 and 33*a* are provided to contact the input terminal 24 by way of the connecting terminals 25 of the safety connector 15, see FIG. 14A. On the center portion between above electrodes 33 and 33*a*, ground terminal 34 is provided to connect with the ground terminal 24*b* and the connecting terminal 25*a*. Scissors-shaped bimetal members 35, 35*a* are secured to ground terminal 34, as illustrated.

The present invention constructed as described above comprises the base stand unit on which the communicating bars 7 and 7*a* are positioned in the inserting grooves 2, 2*a*, 3, 3*a* and 4 (FIGS. 7A and B, 8A and B); the input terminals 5 and the connecting terminals 5*a*, output terminals 6 and the connecting terminals 6*a* respectively, being integrally connected with the communicating bars 7 and 7*a* through the grooves 2, 2*a*, 3, 3*a* and 4; and the terminal 8 providing the proper ground terminal when the base stand units are assembled to provide the terminals stand 11, FIG. 5. It may be seen that the present invention provides a simple combination, precise wiring, safety in case of an overcurrent above 200 A, and eliminate the danger of misconnection. When the safety connectors 15 are inserted on the terminal stand 11 the connectors 15 are held in fixed position by the wall surfaces 13 and 13*a* on both sides of stand 11.

Figure 9A:
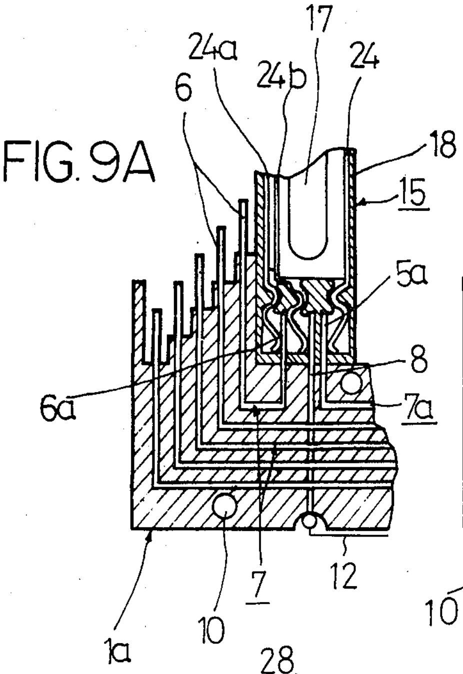
FIGS. 9(A) and (B) are front views illustrating safety connectors on the base stand unit of FIGS. 8(*a*) and (*b*).
Figure 9B:
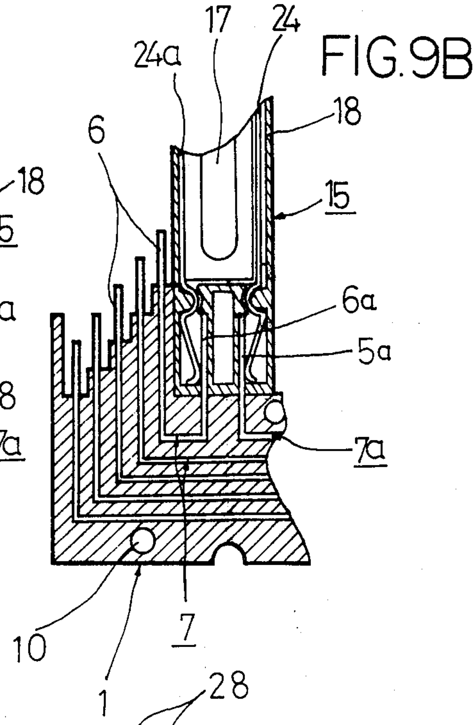

On the lower ends of the ground terminals 8 is placed common ground line 12, FIGS. 8 and 9. Connecting hole 10 are drilled or molded in the base stands 1 and 1*a*.

The safety device in provided by connecting input and output lines of communication lines to the input terminal 5 and the output terminal 6, respectively of the terminal stand 11, and by inserting the safety connectors 15 with the connecting apertures 22, 22*a* and 22*b* into the connecting terminals 5*a*, 6*a* and the ground terminal 8, see FIGS. 8 and 9.

Figure 17A:
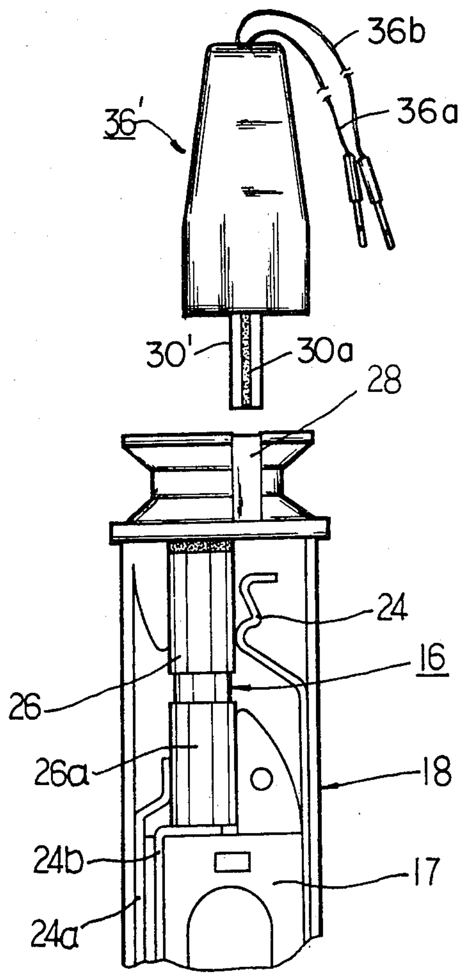
Figure 17B:
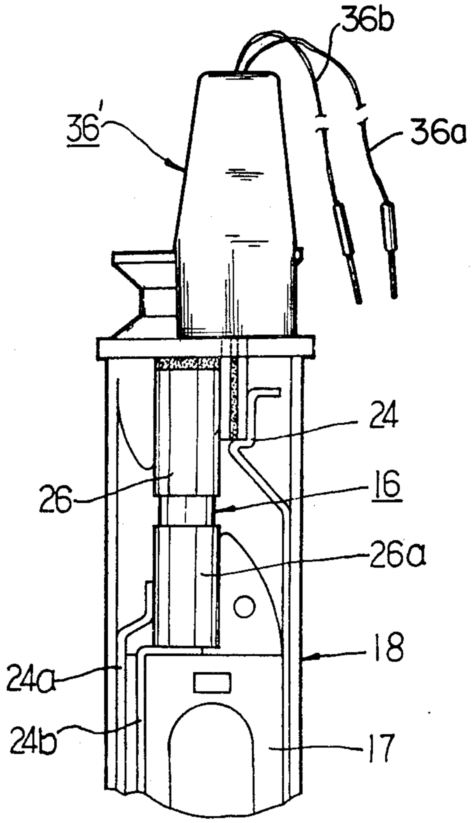
FIG. 17(B) is a sectional view of the plug inserted into the safety device.

As shown in FIGS. 17(A) and (B), by inserting the plug 36′ having conductive strips 30*a* on post 30′ into the hole 28 on the upper side of the housing 18 of the safety jack 15, it is possible to make connection from terminal 24 to plug test leads 36*a*, 36*b*, thereby making it possible to conduct a test of internal circuitry. This may be done whether or not there are abnormal conditions on the communication equipment on the input line side or on the output line side.

In the operation of the safety device constructed as previously described, electric current flows through the circuit of the terminal stand 11 from the input terminals 5 to the connecting terminal 5*a*, the input terminal 24 of the safety connector 15, upper end 26 of the overcurrent protective element 16, heating coil 32 and lower end 26*a* of the overcurrent protective element 16. That heating coil is not overheated by normal current and the circuit is maintained. When overcurrent flows into the circuit, the heating coil runs hot and the bimetal connecting terminals 31 and 31*a* are heated. Then the contact S is closed and the overcurrent passes to ground through the no-load circuit. That is, through the path of the bimetal connecting terminal 31 and 31*a*, and ground end portion 8 of the terminal stand 11. Accordingly, the communication equipment on the input line side is protected.

When the current returns to the normal state, heating coil 32 of the overcurrent protective element 16 cools to its normal operating temperature and the bimetal connecting terminals 31 and 31*a* run cold. Accordingly, the contact S is opened and the circuit is returned to the normal state.

Figures 14A, 14B:
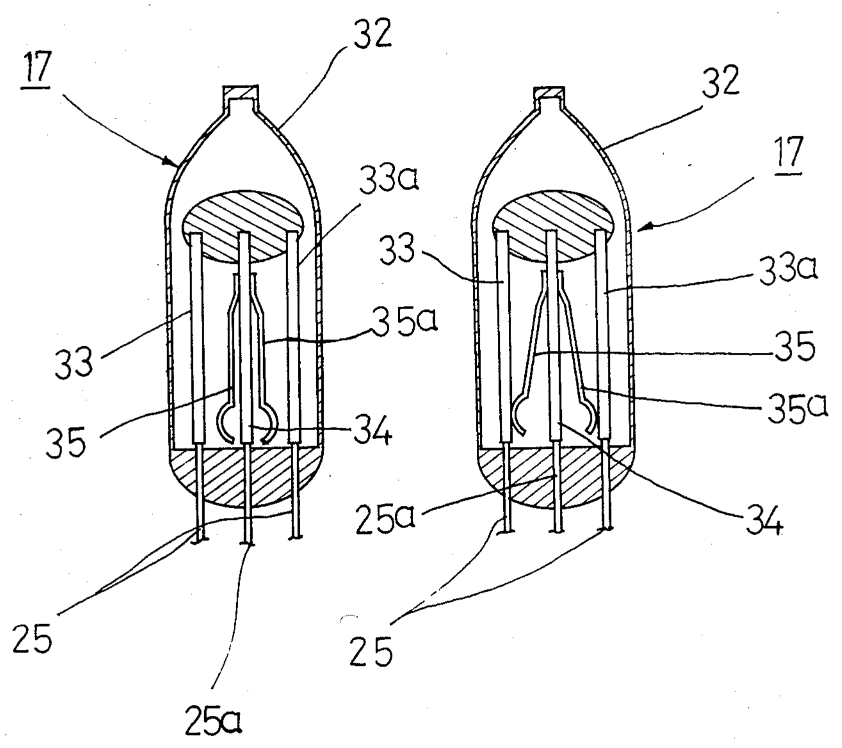
FIGS. 14(A) and (B) are sectional views showing operational states of overvoltage protective elements according to the present invention.

On the other hand, when an overvoltage is applied to the overvoltage protective element 17, which is connected to the input terminal 24 and the ground terminal 24*b*, respectively, a discharge is produced between the nickel electrodes 33, 33*a* and the ground terminal 34, as shown in FIGS. 14(A) and (B). At this time, the heat of the discharge causes bimetal electrodes 35 and 35*a* to expand outwardly and contact the electrodes 33 and 33*a*, thus providing a conduction path to ground through ground electrode 25*a*. Therefore, the communication equipment of the input line side is protected.

When the overvoltage returns to the normal state, the bimetal members 35 and 35*a* cool and return to their positions illustrated in FIG. 14A and the circuit is returned to the original state.

Figure 15:
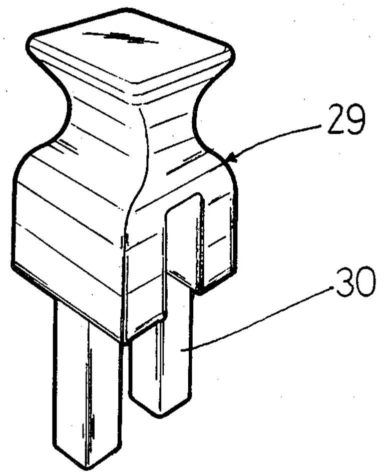
FIG. 15 is a perspective view of a plug according to the present invention.
Figure 16A:
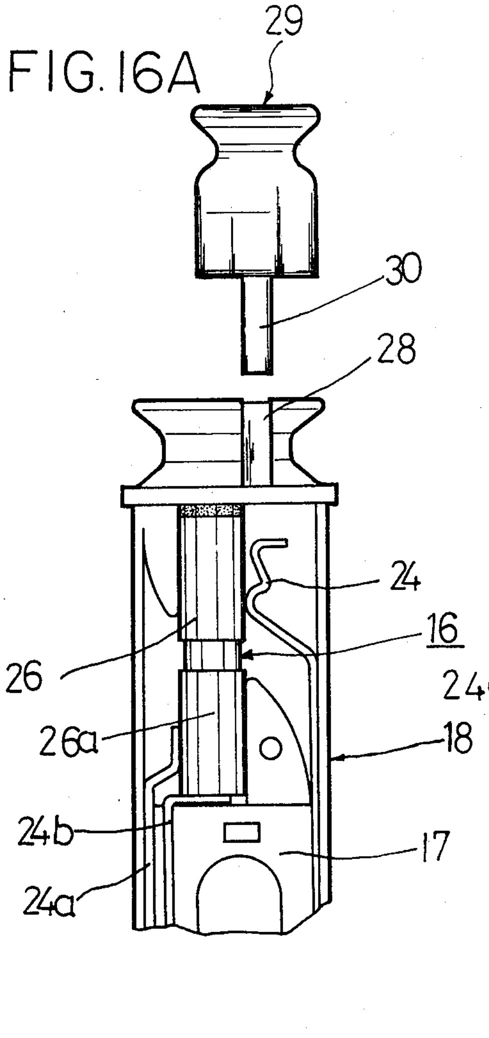
FIGS. 16(A) and (B) are simplified sectional side views showing operational states of the plug according to the present invention.
Figure 16B:
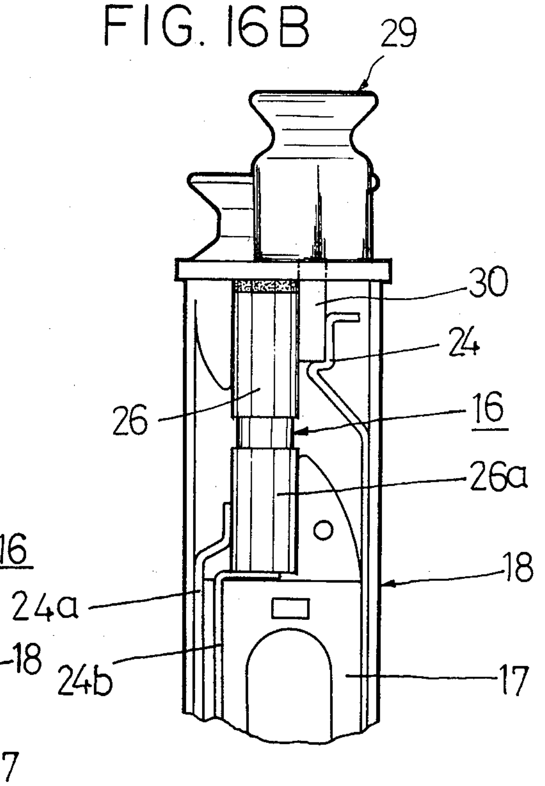

As shown in FIGS. 15 and 16, which illustrates another embodiment of the present invention, when the projecting rod 30 of the plug 29 is inserted into the plug inserting opening 28 on the upper surface of the housing body on the safety connector 15, the rod 30 blocks contact between the upper end 26 of the overcurrent protective element 16 and the input terminal 24. Accordingly, the communication circuit is open circuited. In contrast with this, when the projecting rod 30 is pulled out the circuit returns to its normal state. That is, opening and closing of the circuit may be carried out simply and freely by use of the projecting rod 30 by insertion of the safety connector 15, if necessary.

The present invention comprises forming the terminal inserting grooves 2, 2*a*, 3, 3*a* and 4 on the base stand 1 and 1*a*, (FIGS. 7A and B), inserting therein the input terminals 5 and the connecting terminal 5*a*, the output terminals 6 and the connecting terminal 6*a*, inserting the communicating bars 7 and 7*a*, and the ground terminals 8, to form the base stand unit 9 (FIG. 6), and providing the terminal stand 11 (FIG. 5) by assembling the base stand units 9. Accordingly, the present invention provides the advantages of minimization, increasing the number of lines per unit area, simple manufacturing steps, and elimination of wiring errors.

Further, the safety connector 15 according to the present invention comprises providing the overcurrent protective element 16, the overvoltage productive element 17, input and output terminals 24 and 24*a*, and the ground terminal 24*b*. Accordingly, the safety device is activated by heat of the heating coil 32 or discharge tube 17, to move the bimetal contacts to establish the conduction path to ground.

However, in the normal state. The bimetal members remain relative cool and are inactivated. Thus, the safety connector 15 has the advantages of preventive fires and eliminating the requirement for inspection of each circuit.

While the present invention has been described with reference to specific embodiments thereof, it will be understood that numerous modifications may be made by those skilled in the art without actually departing from the scope of the claimed invention. Accordingly, all modifications and equivalents may be resorted to which fall within the scope of the invention as claimed.

I claim:

1. A safety device for protecting communications equipment that is coupled to a communications line, comprising a plurality of substantially identical base stand units adapted to be held in side-by-side relationship to form a terminal stand, each base stand unit being associated with a respective group of communication lines, a plurality of terminal inserting grooves on a face of each base stand unit, input and output terminals, ground terminals and connecting terminals inserted into the ends of said grooves in the base stand units, rigid communicating bars in said grooves for conductively connecting an input terminal at one end of a groove with a connecting terminal at the opposite end of the groove, for conductively connecting an output terminal at one end of a different groove with a connecting terminal at the opposite end of that different groove, and for conductively connecting a connecting terminal at a still different groove with a ground conductor at the opposite end of said still different groove, safety connector means comprising a housing that includes a ground conductor adapted to be connected to a ground conductor connecting terminal and overcurrent and overvoltage protection means adapted to be connected between connecting terminals of a pair of input and output terminals associated with a communications line, said overcurrent protection means including first and second elongated switch elements, at least one of which is a bimetal element that operates to close said switch elements together when it is heated beyond a predetermined temperature, means connecting said switch elements to said ground conductor when the switch elements close, a heating means closely adjacent said bimetal element and adapted to be connected in circuit between the input and output terminals associated with a given communications line, whereby an overcurrent on said communication line heats the heating means to close said switch elements and connect the communications line to ground, said overvoltage protection means responding to voltages on said communications line that exceed a predetermined magnitude to connect the communication line to ground, said overcurrent and overvoltage protection means automatically returning to an initial, operative condition that disconnects the ground connection after the overcurrent or overvoltage ceases.

2. The safety device claimed in claim 1 wherein said housing includes an aperature in its top surface, and plug means insertable into said aperture in the top surface of the safety device.

3. The safety device claimed in claim 2 wherein said plug is an insulating plug that contacts a movable member in said safety device to open a communications line.

4. The safety device claimed in claim 2 wherein said plug includes at least one plug and a test lead that is external to said housing when the plug is inserted into the aperture in the top of the housing.

5. The safety device claimed in claim 1 wherein the housing includes on one three connector apertures for receiving therein, respectively, the connecting terminals associated with said ground conductor and the input and output terminals associated with a given communications line.

6. The safety device claimed in claim 5 wherein said housing is divided into at least two independent parts and each part has overcurrent and overvoltage protection means and respective terminal receiving means for receiving three connecting terminals associated with said ground conductor and input and output terminals of a respective communication line.

7. The safety device of claim 1 wherein said heating means is provided by a heating coil wound on said bimetal element.

8. A saftety connector means for protecting communications equipment that is coupled to a communications line and which is intended to be mounted on a terminal stand that is comprised of a plurality of substantially identical base stand units, wherein each stand unit is associated with a respective group of communication lines, said base stand also including a plurality of terminal inserting grooves and input and output terminals, ground terminals and connecting terminals coupled to respective input and output terminals, said terminals being inserted into said grooves in the base stand unit, said base stand unit also including communicating bars in said grooves for conductively connecting an input terminal at one end of a groove with a connecting terminal at the opposite end of the groove, for conductively connecting an output terminal at one end of a different groove with a connecting terminal at the opposite end of that different groove, and for conductively connecting a connecting terminal at a still different groove with a ground conductor at the opposite end of said still different groove, said safety connector means comprising a housing that includes a ground conductor adapted to be connected to a ground conductor connecting terminal and overcurrent and overvoltage protection means adapted to be connected between a pair connecting terminals of input and output terminals associated with a communication line, said overcurrent protection means including first and second elongated switch elements, at least one of which is a bimetal element that operates to close said switch elements together when it is heated beyond a predetermined temperature, means connecting said switch elements to said ground conductor when the switch elements close, a heating means closely adjacent said bimetal element and adapted to be connected in circuit between the input and output terminals associated with a given communications line, whereby an overcurrent on said communication line heats the heating means to close said witch and connect the communications line to ground, said overvoltage protection means responding to voltages on said communications line that exceed a predetermined magnitude to connect the communications line to ground, said overcurrent and overvoltage protection means automatically returning to an initial, operative conditions that disconnects the ground connection after the overcurrent or overvoltage ceases.

9. A safety device for protecting communications equipment connected to a communications line and which is intended to be mounted on a terminal stand that includes a plurality of input terminals, output terminals, connecting terminals and means for connecting one group of said connecting terminals with respective input terminals, another group of said connecting terminals with respective output terminals, and a third group of said connecting terminals with one or more ground conductors, said safety device adapted to be inserted into connection with a ground conductor connecting terminal and with a pair of adjacent connecting terminals corresponding to input and output terminals associated with a respective one of a plurality of communications lines, said safety device comprising a housing that includes overcurrent and overvoltage protection means and a ground conductor, said overcurrent protection means including first and second elongated switch elements, at least one of which is a bimetal element that bends to close said switch elements together when heated beyond a predetermined temperature, means connecting said switch elements to said ground conductor in the housing when the switch elements close, a heating means closely adjacent said bimetal element and adapted to be connected in circuit between the input and output terminals associated with a given communications line, whereby an overcurrent on said communication line heats the heating means to close said switch elements and connect the communications line to ground, said overvoltage protection means responding to voltages on said communications line that exceed a predetermined magnitude to connect the communication line to ground, said overcurrent and overvoltage protection means both automatically returning to an initial, operative condition that disconnects the ground connection after the overcurrent or overvoltage ceases.

10. The safety device claimed in claim 9 wherein said heating means is a heating coil wrapped about said bimetal element.

11. A safety device for protecting communications equipment that is coupled to a communications line, comprising a plurality of substantially idential base stand units adapted to be held in side-by-side relationship to form a terminal stand, each base stand unit being associated with a respective group of communication lines, a plurality of terminal inserting grooves on a face of each base stand unit, input and output terminals, ground terminals and connecting terminals inserted into the ends of said grooves in the base stand units, rigid communicating bars in said grooves for conductively connecting an input terminal at one end of a groove with a connecting terminal at the opposite end of the groove, for conductively connecting an output terminal at one end of a different groove with a connecting terminal at the opposite end of that different groove, and for conductively connecting a connecting terminal at a still different groove with a ground conductor at the opposite end of said still different groove, said communications bars being held between adjacent base stand units, safety connector means adapted to be inserted into connection with a ground conductor connecting terminal and with a pair of adjacent connecting terminals corresponding to input and output terminals associated with a respective communications line, said safety connector means comprising a housing that includes a ground conductor adapted to be connected to a ground conductor connecting terminal and overcurrent and overvoltage protection means adapted to be connected between a pair of input and output terminals associated with a communications lines, said overvoltage protection means including two electrodes connected between an input terminal and ground and adapted to provide a discharge path therebetween only when the voltage therebetween exceeds a predetermined magnitude, one of said electrodes being connected to said ground conductor in the safety connector means and the other electrode being adapted to be connected to one of said connecting terminals, said electrodes and said ground conductor of the safety connector being disposed in a discharge tube that includes means for connecting the electrodes to connecting terminals, a bimetal member connected to the ground conductor in said discharge tube and adapted to connect the electrodes when heated beyond a predetermined temperature, said overvoltage protection means automatically returning to an initial, operative condition that disconnects the ground connection after the overvoltage ceases.

12. The safety device of claim 11 wherein said overvoltage protective element is provided by disposing both electrodes and ground terminal a discharge tube, means for connecting the electrodes to connecting terminals, and bimetal members on both sides of the ground terminal and adapted to contact the electrodes when heated.

* * * * *